United States Patent Office 3,527,738
Patented Sept. 8, 1970

3,527,738
ALKENYL GLYCIDYL ETHER COPOLYMERS
William S. Pickle, New Orleans, La., assignor to The Dow Chemical Company, Midland, Mich., a corporation of Delaware
No Drawing. Filed June 4, 1968, Ser. No. 734,214
Int. Cl. C08f 15/36
U.S. Cl. 260—78.5                  13 Claims

ABSTRACT OF THE DISCLOSURE

High molecular weight interpolymers may be prepared from alkenyl glycidyl ethers by polymerizing said ethers in specific proportions with unsaturated dicarboxylic acid anhydrides, imides or diesters.

BACKGROUND OF THE INVENTION

This invention relates to high molecular weight interpolymers having a plurality of pendant epoxide groups obtained by the polymerization of specific proportions of alkenyl glycidyl ethers and unsaturated dicarboxylic acid anhydrides, imides or diesters.

Known allyl glycidyl ether carbon backbone polymers are usually low molecular weight polymers. The polymerization requires severe polymerization conditions, high initiator concentrations and results in a low degree of conversion of the allyl glycidyl ether. The latter necessitates a large excess of allyl glycidyl ether and the attendant problems of separation and recovery of unpolymerized allyl glycidyl ether.

Some of the copolymers of allyl glycidyl ether are taught in U.S. 2,687,405 (with acrylate esters); U.S. 2,589,237 (with vinyl chloride); and U.S. 2,650,151 (with acrylonitrile). U.S. 3,040,010 discloses copolymers of allyl glycidyl ether and vinyl acetate. It further discloses that it is known to heat allyl glycidyl ether and maleic acid or anhydride to produce "a resinous product . . . (which is) an alkyd resin rather than a copolymer since little or no carbo-polymerization occurs."

SUMMARY OF THE INVENTION

The present invention relates to high molecular weight carbon backbone interpolymers of alkenyl glycidyl ethers which may be prepared in high yield with lower initiator levels than before, and the alkenyl glycidyl ether is utilized to high predictable monomer ratios.

It has been discovered that high molecular weight interpolymers may be obtained by polymerizing alkenyl glycidyl ethers with unsaturated dicarboxylic acid diesters, imides or anhydrides in the specific molar ratios of 1:2 to 2:1. The resulting interpolymers have a plurality of pendant, unaltered three-membered epoxide rings such as is contained in the glycidyl radical.

Optionally, the high molecular weight interpolymers may also contain at least one other copolymerizable monomer provided the monomer is different from and unreactive with the epoxide or anhydride group of the above monomers and provided the above molar ratio is not altered.

DETAILED DESCRIPTION

According to the invention the interpolymers are prepared from (a) an alkenyl glycidyl ether, (b) an unsaturated dicarboxylic acid diester, imide or anhydride and, optionally, (c) at least one other copolymerizable vinylidene monomer different from the monomers of (a) and (b) and unreactive with the epoxide or anhydride functionality.

Alkenyl glycidyl ethers may contain an alkenyl group such as allyl, methallyl, propenyl, crotyl, vinyl and the like. Additionally the glycidyl group may contain alkyl substituents, particuarly, substituents attached to the methylene carbon. Suitable alkenyl glycidyl ethers include allyl glycidyl ether, vinyl glycidyl ether, methallyl glycidyl ether, isopropenyl glycidyl ether and the like. The preferred monomer is allyl glycidyl ether.

Suitable unsaturated cyclic dicarboxylic acid anhydrides include maleic anhydride, citraconic anhydride, chloromaleic anhydride, itaconic anhydride and the like. Imides include the corresponding imides and N-alkyl imides of said anhydrides wherein the alkyl group contains from 1 to about 4 carbon atoms. Examples of such imides include maleimide, N-butyl maleimide and the like. Diesters include the methyl ethyl, butyl and the like diesters of maleic acid, citraconic acid, itaconic acid and the like.

Optional copolymerizable vinylidene monomers include vinylidene aromatic monomers such as styrene, alpha-methyl styrene, vinyl toluene, chlorostyrene, t-butyl styrene and the like; esters of acrylic and methacrylic acids such as cyclohexyl acrylate, 2-ethylhexyl acrylate, butyl methacrylate and the like; vinyl esters such as vinyl acetate; vinyl ethers; vinyl and vinylidene halides; butadiene and the like.

Advantageously the high molecular weight interpolymers are obtained when certain specific proportions of monomers are utilized. The molar ratio of alkenyl glycidyl ether to the unsaturated anhydride, imide or diester may range from 1:2 to 2:1 and preferably ranges from 1:1 to 2:1. When the optional monomers are utilized the molar ratio of said epoxide to said anhydride, amide or diester to said optional monomer may range from 1:2:0 to 2:1:10 and preferably ranges from 1:1:0 to 2:1:5.

The interpolymers are preferably prepared by solution polymerization techniques known to the art including such steps as portionwise addition of the monomers to the reactor and the like. A wide range of temperatures may be used depending on the choice of monomers, speed of polymerization desired and other well known factors. The temperature may range from —30° C. to 150° C. (in general from the melting point to the boiling point of the major component) and preferably ranges from 45° to 95° C. Preferably the polymerization is conducted at atmospheric pressure but pressures up to 200 p.s.i.g. and more are operative.

Yields are generally high, greater than 50% in almost all cases tried, and normally are 75–95% with excellent yields in cases where the polymer stays in solution. Inert solvents useable are well known to the art and will vary depending on the choice of monomers. Free radical yielding catalyst such as benzoyl peroxide, azobisisobutyronitrile, t-butyl peroxide and the like are generally used.

The following non-limiting examples are given to further illustrate the invention. All parts and percents are by weight unless otherwise specified.

EXAMPLE 1

To a 1-liter resin kettle (glass) was added 263 g. benzene (300 ml.) dried by azeotropic distillation. To this was added 34.0 g. allyl glycidyl ether (0.30 mole), 30.0 g. maleic anhydride (0.33 mole), and 138.6 g. cyclohexyl acrylate (0.90 mole) and 50 p.p.m. of the methyl ether of hydroquinone (MEHQ). The monomer mixture was purged with nitrogen with slow stirring for 30 minutes at room temperature. Then 0.50 g. benzoyl peroxide was added and the temperature raised to 70° C. The temperature was maintained at 70° C. for 65 hours. The condenser was then removed and a nitrogen purge was used to strip out the monomers with benzene at 70° C. When the mixture was nearly solid, methylene chloride (dried with NaOH pellets) was added and the polymer put back into solution. The mixture was bottled, concentrated, and weighed. The solution was titrated directly for epoxide and for anhydride groups and percent solids determined. The solution contained 13.78 percent solids. The interpolymer contained 13.6 percent maleic anhydride and 11.8 percent allyl glycidyl ether. This calculates to be 0.103 equivalents of epoxide per 100 gms. of resin or an epoxide equivalent weight of 974.

A coating of the interpolymer on metal panels was baked for 15 minutes at 130° C. to give a glass-like coating. Adherence and clarity were excellent. Samples dried on glass at room temperature were tacky at or below 80° C. When heated, they thermoset to a glassy clear solid. The MEHQ which acts as an inhibitor for vinyl polymerization (usually present in the monomers) also acts as an initiator to epoxide polymerization by providing a free, reactive hydroxyl group. Other polymers made with low levels (7–10 p.p.m.) of MEHQ did not rapidly thermoset until a tertiary amine, $BF_3$ catalyst or the like was added.

late; iBuAcr—isobutyl acrylate; BuAcr—butyl acrylate; STy—styrene; and EHAcr—2-ethyl hexyl acrylate. The results of these polymerizations are shown in the following table.

TABLE

| Ex. | Monomer Compound | | | Solvent, Type/Amt. | Catalyst, Type/Amt. | Yield | | Polymer Compound, percent by Weight | |
|---|---|---|---|---|---|---|---|---|---|
| | | Grams | Moles | | | Grams | Percent | | |
| 3 | AGE | 24.3 | 0.26 | Benzene/87.9 g | Lupersol [1] 11/1.25 cc | 57.9 | 85.3 | AGE | 25.0 |
| | MA | 25.0 | 0.25 | | | | | MA | 50.0 |
| | VAc | 18.6 | 0.25 | | | | | VAc | 25.0 |
| 4 | AGE | 17.0 | 0.15 | Benzene/263 g | Lupersol 11/0.25 cc | 131.0 | 81.4 | AGE | 10.3 |
| | MA | 15.0 | 0.15 | | | | | MA | 9.2 |
| | CHAcr | 139.0 | 0.90 | | | | | CHAc | 80.5 |
| 5 | AGE | 34.0 | 0.30 | do | Benzoyl Peroxide/0.50 g | >151.0 | >75.0 | AGE | 11.8 |
| | MA | 30.0 | 0.30 | | | | | MA | 13.6 |
| | CHAcr | 139.0 | 0.90 | | | | | CHAc | 74.6 |
| 6 | AGE | 17.0 | 0.15 | do | Vazo [2]/ 0.255g | 135.0 | 85.3 | AGE | 9.2 |
| | MA | 15.0 | 0.15 | | | | | AGE | 11.5 |
| | iBuAcr | 124.0 | 0.98 | | | | | iBuAc | 79.3 |
| 7 | AGE | 139.7 | 1.23 | Benzene/1,055 g | Benzoyl Peroxide/1.0 g | 715.0 | 94.0 | AGE | 10.3 |
| | MA | 120.0 | 1.20 | | | | | MA | 17.7 |
| | BuAcr | 500.4 | 3.90 | | | | | BuAc | 72.0 |
| 8 | AGE | 34.0 | 0.30 | Benzene/263 g | Benzoyl Peroside/0.50 | 128.0 | 67.0 | AGE | 13.0 |
| | MA | 30.0 | 0.30 | | | | | MA | 20.0 |
| | Sty | 126.6 | 1.38 | | | | | Sty | 67.0 |
| 9 | AGE | 34.0 | 0.30 | MEK [3]/241.5 g | Benzoyl Peroxide/ 0.25 g | 92.2 | 48.4 | AGE | 24.3 |
| | MA | 30.0 | 0.30 | | | | | MA | 9.2 |
| | Sty | 126.6 | 1.38 | | | | | Sty | 67.5 |
| 10 | AGE | 34.0 | 0.30 | Benzene/263 g | Benzoyl Peroxide/ 0.50 g | 111.0 | 58.3 | AGE | 14.0 |
| | MA | 30.0 | 0.30 | | | | | MA | 30.0 |
| | EHAcr | 35.2 | 0.19 | | | | | EHA | 11.0 |
| 11 | AGE | 34.0 | 0.30 | do | do | 148.0 | 71.2 | AGE | 12.0 |
| | MA | 30.0 | 0.30 | | | | | MA | 23.0 |
| | Sty | 72.4 | 0.78 | | | | | Sty | 40.0 |
| | BuAcr | 71.5 | 0.56 | | | | | BuAc | 25.0 |
| 12 | AGE | 34.8 | 0.30 | MEK/241.5 g | Benzoyl Peroxide 0.25 g | 97.6 | 51.3 | AGE | 25.0 |
| | MA | 30.0 | 0.30 | | | | | Sty | 30.0 |
| | Sty | 90.5 | 0.98 | | | | | Sty | 36.0 |
| | EHAcr | 35.2 | 0.19 | | | | | EHA | 9.0 |

[1] Lupersol 11 is t-butyl peroxy pivalate, 75% solution in mineral spirits.
[2] Vazo is azo-bisisobutyronitrile.
[3] MEK = Methyl ethyl ketone.

EXAMPLE 2

To a reactor as in Example 1 containing 263 g. of dry benzene was added 126.6 g. styrene (1.21 moles) (uninhibited), 34.0 g. allyl glycidyl ether (0.30 mole) and 30.0 g. maleic anhydride (0.33 mole). The mixture was purged with nitrogen for 30 minutes at room temperature and then 0.50 g. benzoyl peroxide added. The kettle was heated to 70° C. and held there for 9 hours with slow agitation. Yield was 128.4 g. of a white powder insoluble in benzene and containing 13±3% allyl glycidyl ether and 20±2% maleic anhydride. The white powder represented a 67.0% yield. The interpolymer had limited solubility in dimethyl formamide, could be transfer-molded from 205–295° C. and thermosets to a colorless, brittle film.

EXAMPLES 3–12

A series of interpolymers were prepared in a manner similar to the preceding examples. The following abbreviations are used: AGE—allyl glycidyl ether; MA—maleic anhydride; VAC—vinyl acetate; CHAcr—cyclohexyl acry-

EXAMPLE 13

To 242 g. dried methyl ethyl ketone was added 100 g. styrene (1.08 moles), 46.23 g. maleic anhydride (0.46 mole), 53.67 g. allyl glycidyl ether (0.47 mole) and 1.00 g. benzoyl peroxide. This mixture was purged with nitrogen and then heated to reflux temp. (84° C.). This temperature was maintained for 43 hours. The polymer was then precipitated from the supersaturated solution by the addition of petroleum ether to the cooled reactor. The product was broken up, filtered and washed (hexane) and then dried with nitrogen gas. Yield was 173 g. (86.3%) of a snow white solid which could be dissolved in ketones and some other oxygenated solvents. Chemical methods show 28.4 percent allyl glycidyl ether and 24.6 percent maleic anhydride in the polymer. The product can be molded yielding tough colorless solids.

EXAMPLE 14

To 242 g. dry methyl ethyl ketone was added 100 g. styrene (1.08 moles) 22.30 g. maleic anhydride (0.22 mole), 77.7 g. allyl glycidyl ether (0.68 mole) and 1.00 g. benzoyl peroxide. The mixture was purged with nitrogen and polymerized at 85° C. (reflux) for 44 hours. The nitrogen purge was restarted, the mixture cooled and the interpolymer precipitated with hexane. After washing and filtering, the interpolymer was dried with nitrogen. The fine white product was soluble in ketones and other oxygenated solvents. The yield was 101.5 g. (50.8%) of a polymer containing 34.5 percent allyl glycidyl ether and 18.5 percent maleic anhydride.

EXAMPLE 15

To 242 g. dry MEK in a half liter resin kettle was added 92.46 g. maleic anhydride (0.92 mole), 107.3 g. allyl glycidyl ether (0.93 mole) and 1.00 g. benzoyl peroxide. The mixture was purged with nitrogen for longer than ½ hour as the temperature was rapidly raised to 84° C. The temperature was then controlled at 75° C. for 60 hours. The product remained soluble and was faint pink in color. Clear, hard, tough films were cast with this product. The polymer was precipitated with hexene, broken up, filtered, washed with hexane, and dried over a nitrogen stream.

Yield was 125 g., 62.5 percent of theory, of a light tan polymer containing 40 percent MA and 60 percent AGE. The polymer softened at 80° C. and rapidly thermoset at 200° C.

EXAMPLE 16

To 263 g. of benzene was added 100.0 g. 2-ethyl hexyl acrylate, 46.23 g. maleic anhydride (0.46 mole), 53.67 g. allyl glycidyl ether (0.47 mole), and 1.00 g. benzoyl peroxide. This mixture was purged with nitrogen for more than 30 minutes as the temperature was rapidly raised to reflux (83.5° C.). This temperature was maintained for 60 hours. A viscous water white solution resulted. The product was precipitated and washed with hexane and then filtered. It was dried with nitrogen. This product is a soft white solid, soluble in ketones, chlorinated solvents and aromatic solvents. The product yield was 126.4 gms. (63.2%) of an interpolymer containing 25 percent AGE and 34 percent MA.

The interpolymers of the invention are of high molecular weight as they are all high melting solids (80° to 250° C.), except for those prepared with long chain acrylate esters which, generally, are tacky at room temperature.

Because of the pendant epoxide group present in the interpolymer, the compositions of this invention may be readily cured by heating with a variety of catalysts well known to the art such as a tertiary amine, an acid, a metal alkylate, $BF_3$ and the like. Other standard polyfunctional curing agents for polyepoxide resins may also be used such as polyamines, polyols and the like. When the interpolymers are prepared to contain an anhydride group as well as the epoxide group, the interpolymers are self-curing on heating. Again, epoxide/anhydride catalysts well known to the art may be used. Generally, the interpolymers thermoset when heated to about 100° C. and up to about 200° C. or higher.

The thermosetting characteristics of the interpolymers may be utilized in the preparation of enamel-like coatings. Advantages shown include superior clarity and color to other polymeric coatings, good adherence and toughness. The solids are also moldable by such methods as transfer molding and have utility in reinforced plastics.

The above description and examples are set forth for purposes of illustration only. Variations and modifications thereof will be obvious to those skilled in the art and may be made without departing from the scope of the invention herein described.

I claim:

1. An interpolymer composition having pendant epoxide groups comprising the free-radical polymerized product of a mixture of (a) an alkenyl glycidyl ether, (b) an unsaturated dicarboxylic acid monomer selected from the group consisting of anhydride, imide, N-alkylimide wherein the alkyl group contains from 1 to about 4 carbons, diester and mixtures thereof and (c) at least one other copolymerizable monomer different from the monomers of (a) and (b) above and unreactive with an epoxide or anhydride group; said monomers in (a), (b) and (c) combined in the molar proportions of 1:2:0 to 2:1:10, respectively.

2. The compositions of claim 1 wherein said alkenyl glycidyl ether is allyl glycidyl ether.

3. The composition of claim 1 wherein said anhydride monomer is maleic anhydride.

4. The composition of claim 1 wherein said monomers are combined in the mole ratio of 1:1:0 to 2:1:5, respectively.

5. The composition of claim 1 wherein said optional monomer is a monovinyl aromatic monomer, an ester of acrylic acid or an ester of methacrylic acid.

6. An article comprising the heat-cured composition of claim 1.

7. An article comprising a substrate coated with the heat cured composition of claim 1.

8. An interpolymer composition having pendant epoxide groups comprising the free-radical polymerized product of a mixture of (a) an alkenyl glycidyl ether and (b) an unsaturated dicarboxylic acid monomer selected from the group consisting of anhydride, imide, N-alkylimide wherein the alkyl group contains from 1 to about 4 carbon atoms, diester and mixtures thereof; said monomers in (a) and (b) combined in the molar proportions of 1:2 to 2:1, respectively.

9. The composition of claim 8 wherein said alkenyl glycidyl ether is allyl glycidyl ether.

10. The composition of claim 8 wherein said anhydride monomer is maleic anhydride.

11. The composition of claim 8 wherein said monomer proportions range from 1:1 to 2:1.

12. An article comprising the heat-cured composition of claim 8.

13. An article comprising a substrate coated with the heat-cured composition of claim 8.

References Cited

UNITED STATES PATENTS 2,966,479   12/1960   Fischer _____ 260—78.4
3,352,827   11/1967   Sekmakas _____ 260—72

JOSEPH L. SCHOFER, Primary Examiner

J. KIGHT, Assistant Examiner

U.S. Cl. X.R.

260—80.76, 80.8, 80.81